Sept. 30, 1941. F. W. COTTERMAN 2,257,333
AUTOMATIC CLUTCH AND TRANSMISSION GEARING
Filed Feb. 18, 1939 4 Sheets-Sheet 1
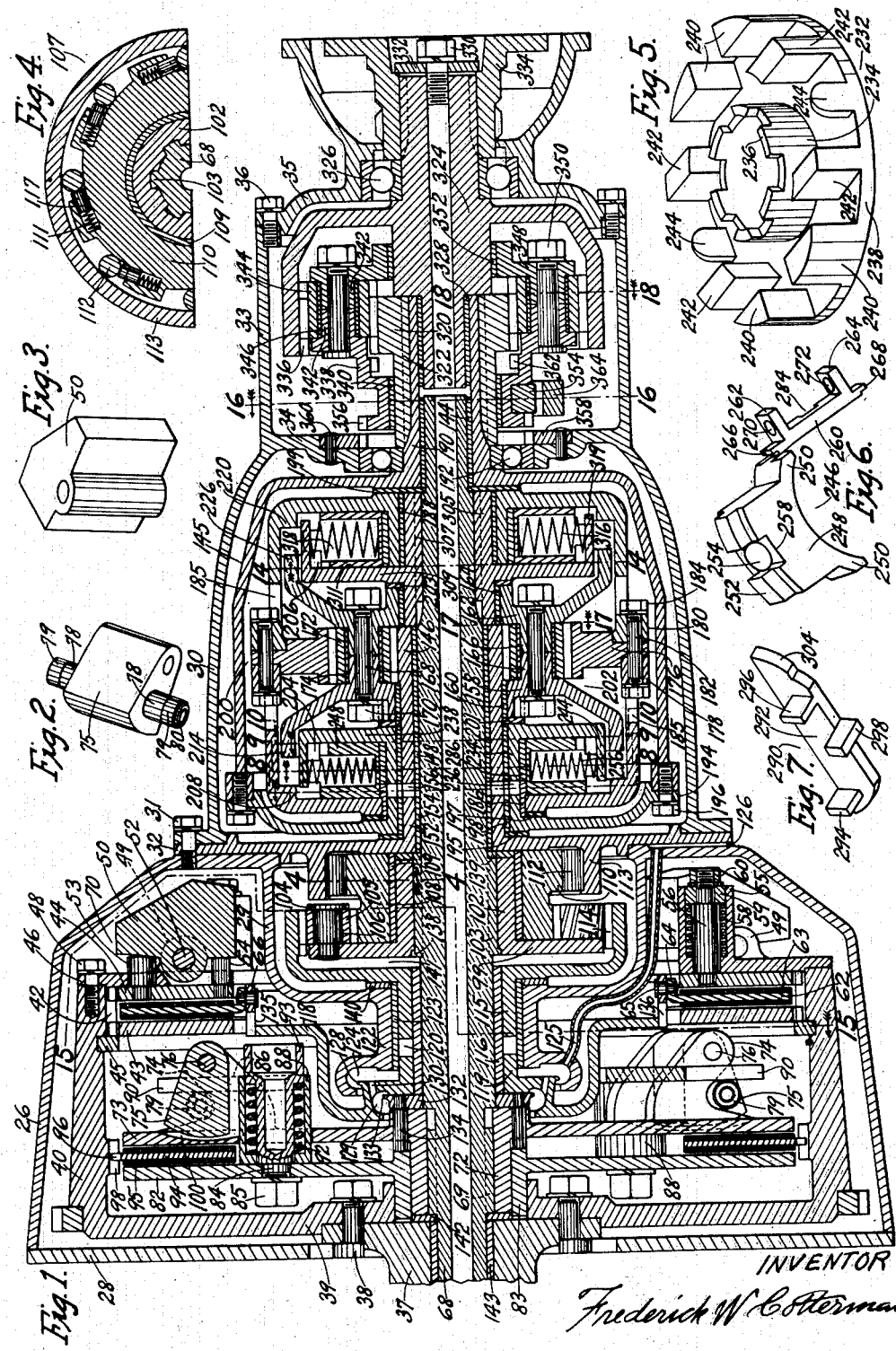
INVENTOR
Frederick W. Cotterman

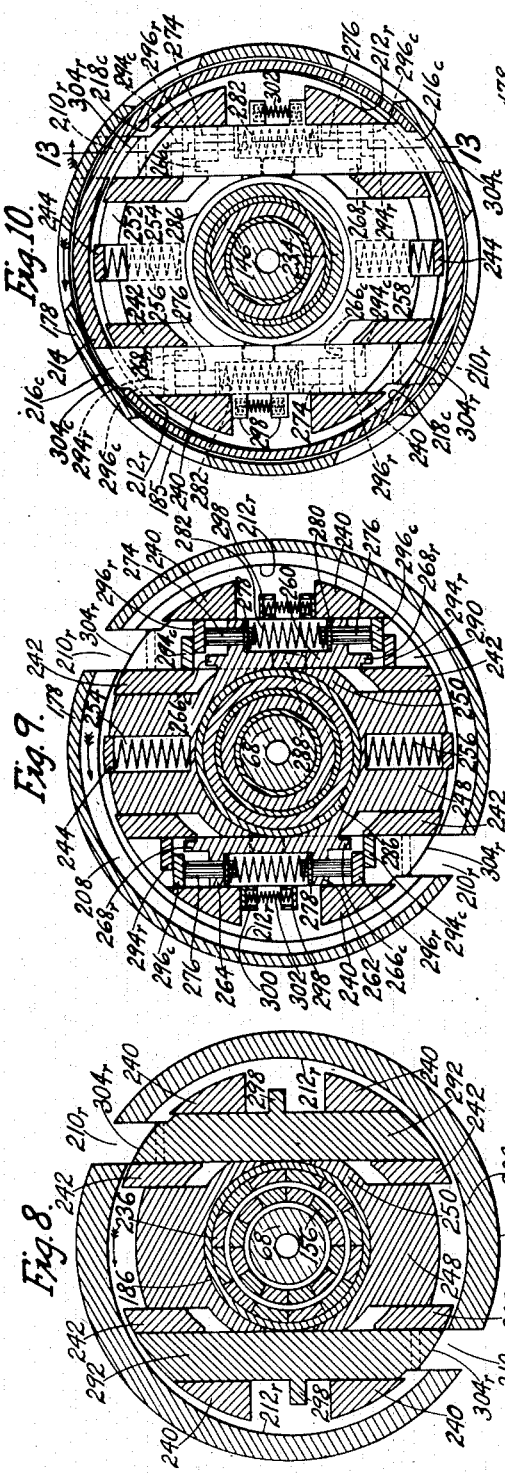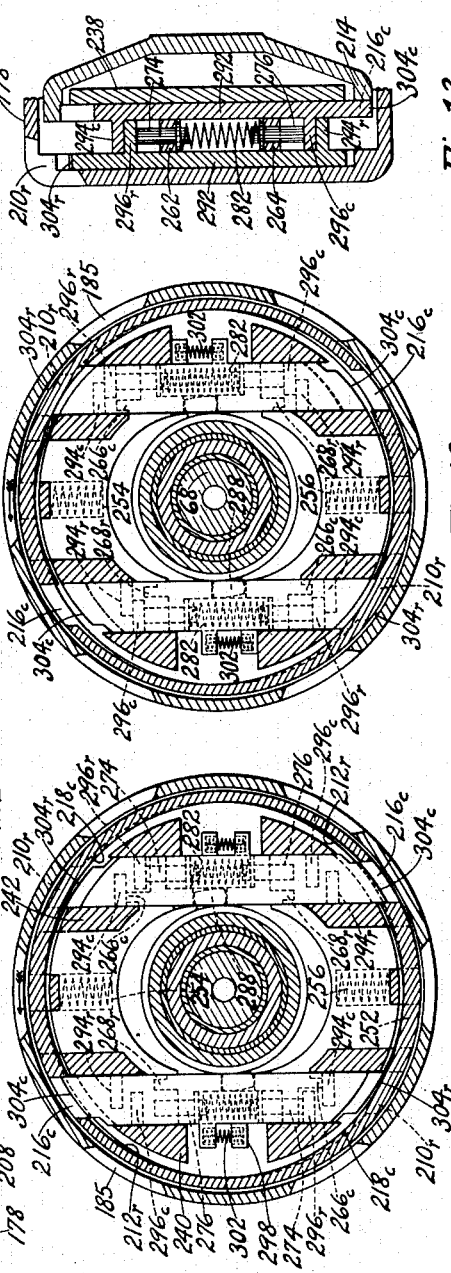

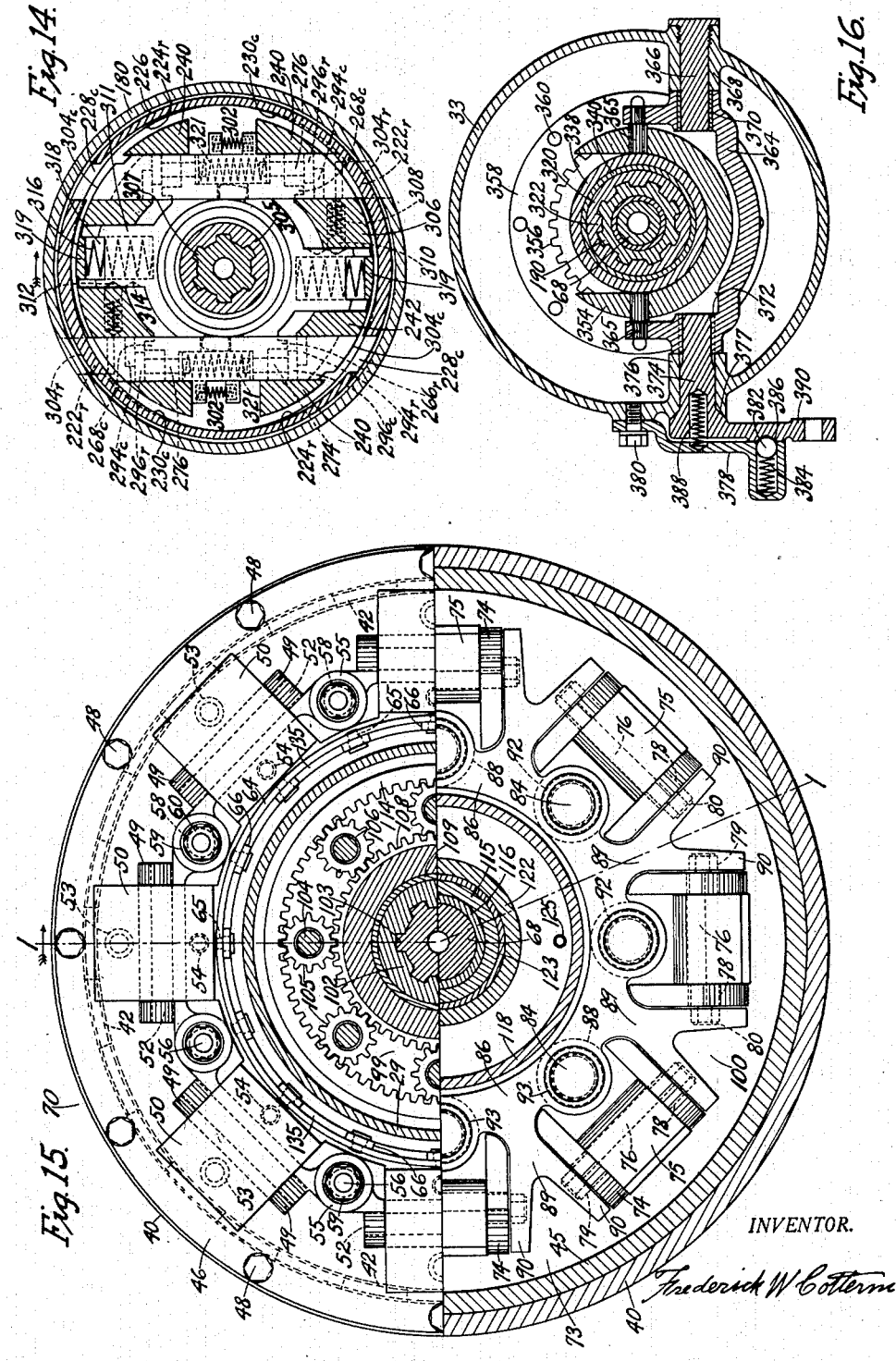

INVENTOR.

Frederick W. Cotterman

Patented Sept. 30, 1941

2,257,333

UNITED STATES PATENT OFFICE 2,257,333

AUTOMATIC CLUTCH AND TRANSMISSION GEARING

Frederick W. Cotterman, Dayton, Ohio, assignor of one-half to Bessie D. Apple, Dayton, Ohio Application February 18, 1939, Serial No. 257,052

28 Claims. (Cl. 74—260)

This invention relates to automatic clutch and transmission gearing and is especially applicable to motor vehicles.

An object of the invention is to provide transmission gearing having six forward gear ratios with the highest ratio an overdrive, together with clutch mechanism for connecting the engine to the transmission, all fully automatic and occupying no greater space than commercial hand shift devices of equal range and capacity.

Another object is to so construct and arrange the transmission gearing and clutch mechanism that if the mechanism is operating in either underdrive, direct, or overdrive ratios and there arises a need for more power than the engine can deliver at the then existing speed, a step down in ratio will automatically take place to allow the engine to rise to a more appropriate speed.

Another object is to provide a transmission gear set comprising a sun gear, a ring gear, planet pinions and carrier, with speed responsive clutch means to connect the several elements variously between the input and output members to provide underdrive, direct, and overdrive ratios, and a booster gear set also comprising a sun gear, a ring gear, planet pinions and carrier, with means responsive to both speed and torque to connect the booster gear set in series with the transmission gear set, whereby a step down or a step up of one speed is always had when speed-load conditions warrant no matter in which of its several ratios the transmission gear is then operating, whereby the device is also subject to the will of the driver, in that he may, by suddenly changing the amount of applied power by means of the engine accelerator, cause a shift up or down as the case may be.

Another object is to provide the transmission gear set with two positive clutches, the first being on the transmission output member and normally clutching the carrier and the second on the transmission input member and normally clutching the ring gear, whereby the transmission gear set acts as a speed reducing device or underdrive, the first clutch being operable at a relatively low predetermined speed to release the carrier and clutch the ring gear, whereby both input member and output member will be clutching the ring gear to provide a direct drive ratio, and the second clutch being operable at a higher predetermined speed to release the ring gear and clutch the carrier, whereby the gearing acts as a speed increasing device or overdrive, the sun gear being at all times fixedly secured against rotation.

Another object is to so construct the clutch mechanism of the transmission gear set that there will be positive two-direction driving connections between the several elements, in underdrive, in direct drive, and in overdrive, and so that when a shift from one ratio to the other is taking place, the clutches, both of which are operative to release one element and clutch a second, always clutch the said second before they release the first, to the end that there will be no free wheeling, either in underdrive, direct, or overdrive, or during the transition period in the shift from any one ratio to another.

Another object is to provide a main engine clutch, responsive to the speed of the engine, to connect the engine to the transmission input member through the booster gear, and an auxiliary engine clutch, responsive to the speed of the vehicle to connect the engine to the transmission input member directly and independently of the booster gear, whereby, if the vehicle is coasting while the engine is dead or is idling, the engine will be connected for engine braking at a low vehicle speed by said auxiliary clutch.

Another object is to so construct and arrange the gear mechanism with respect to the main and auxiliary engine clutches, that the engine clutches will be contained in an entirely separate housing from the gears, whereby the gears may be fully lubricated and the engine clutches may be kept dry, to the end that dry plate clutches, which have been proven the most adaptable, may be employed.

Another object is to so construct the main engine clutch that its engagement secures the ring gear of the booster gear set to the engine, then connect the carrier to the transmission input member and provide a one way brake to prevent backward rotation of the sun gear, to the end that, whenever the main clutch engages, engine power at reduced speed will be transmitted through the ring gear to the carrier and therefore to the transmission input member.

Another object is to provide, in the booster gear set, gearing with helical teeth, so angled that the tangential load carried by the gearing causes an end thrust in a direction proper for disengaging the auxiliary engine clutch, with proper means to apply the end thrust to the auxiliary engine clutch to disengage it and keep it fully disengaged as long as the booster gear is transmitting power, to the end that no dragging action may be present in the auxiliary clutch by partial or insufficient engaging pressure.

Another object is to provide, in both the engine clutches and the transmission clutches, means for causing the centrifugal weights of a set to all move together, to the end that no one weight of a set may move outwardly ahead of the others and thereby cause an unbalanced effect.

Another object is to arrange the connection between the main engine clutch and the booster ring gear that, although the ring gear is connected to be rotated, it may nevertheless move axially by load on its helical teeth, to the end that the axial pressure of the ring gear which will vary with the torque being transmitted, may delay engagement of the auxiliary engine clutch which eliminates the drive through the booster gear.

Another object is to so construct the auxiliary engine clutch that it is normally disengaged, and place its speed responsive mechanism on a vehicle driven member, whereby starting of the vehicle from rest will always be done through the booster gear, although the length of time the booster gear will continue in effect will depend on the balance between the end thrust of the ring gear and the vehicle driven speed responsive means of the auxiliary clutch.

Another object is to provide for the auxiliary engine clutch, which engages to eliminate the booster gear, a resilient means normally inoperative to engage the clutch, and centrifugal weight means rotated in proportion to vehicle speed and normally adapted, at a low vehicle speed, to first apply said resilient means to urge engagement of said clutch, then further stress the resilient means to more strongly urge clutch engagement as the vehicle speed increases, whereby the speed at which the axial thrust of the booster ring gear may be overcome and the booster gear eliminated will vary with the torque being transmitted by said gear.

Another object is to so construct the resilient means and the centrifugal weight means of the auxiliary engine clutch that the force of the weights will be applied to stress the resilient means through a leverage which becomes progressively less effective as the speed increases, whereby the stress of the resilient clutch engaging means will increase at a rate which is less than directly proportional to the R. P. M. instead of at a rate proportional to the square of the R. P. M. as it does where the force of centrifugal weight means is applied directly, or through an unvarying leverage, as in common practice, to the end that sufficient clutch engaging pressure may be had at the lower speeds without having too great a clutch engaging pressure at the higher speeds.

Another object is to so construct the clutch mechanism which controls the booster gear that direct drive will always be fully accomplished before booster gear drive is eliminated, the one, by engagement, lifting the load off the other, to the end that there will be no period between booster gear drive and direct drive in which there is no drive, as there is in conventional gear shift mechanisms.

Another object is to provide a simple and effective reversing gear set separate from the other gear sets, with a manually operable lever to shift from the forward to a neutral position only when starting or limbering up the engine, and to a reverse position only when backing the vehicle, the lever being kept in the forward position at all other times and under all other driving conditions.

These and other objects are attained in the structure hereinafter described and illustrated in the drawings wherein, Fig. 1 is a longitudinal, vertical axial section through the complete mechanism, taken on the line 1—1 of Fig. 15.

Fig. 2 is a detail perspective view of one of the centrifugal weights provided for operating the auxiliary engine clutch.

Fig. 3 is a detail perspective view of one of the centrifugal weights provided for operating the main engine clutch.

Fig. 4 is a half transverse section through a part of the booster gear mechanism taken at 4—4 of Fig. 1 and showing the roller brake for holding the booster sun gear against backward rotation.

Fig. 5 is a detail perspective view of the frame of one of the positive clutches in the transmission gear set.

Fig. 6 is a detail perspective view of one of the centrifugal weights, two of which are provided to operate each of the positive clutches in the transmission gear set.

Fig. 7 is a detail perspective view of one of the pawls, four of which are employed in each of the positive transmission clutches.

Fig. 8 is a transverse section taken at 8—8 of Fig. 1 through the output member clutch of the transmission gear set.

Fig. 9 is a transverse section taken at 9—9 of Fig. 1 through the output member clutch of the transmission gear set.

Fig. 10 is a transverse section, taken at 10—10 of Fig. 1 through the output member clutch of the transmission gear set.

Fig. 11 is a transverse section, also taken at 10—10 of Fig. 1, but after the clutch has partially operated to release the carrier and clutch the ring gear.

Fig. 12 is a transverse section, also taken at 10—10 of Fig. 1, but after the clutch has fully operated to release the carrier and clutch the ring gear.

Fig. 13 is a partial section taken at 13—13 of Fig. 10, showing the interaction of two pawls of the output member clutch.

Fig. 14 is a transverse section, taken at 14—14 of Fig. 1 through the input member clutch of the transmission gear set.

Fig. 15 is a transverse sectional view taken at 15—15 of Fig. 1, the upper half of the view showing the main engine clutch and the gearing of the booster gear set in end elevation and the lower half showing the auxiliary engine clutch in end elevation.

Fig. 16 is a transverse section, taken at 16—16 of Fig. 1, through the manually operable portion of the reversing gear set.

Figure 19:
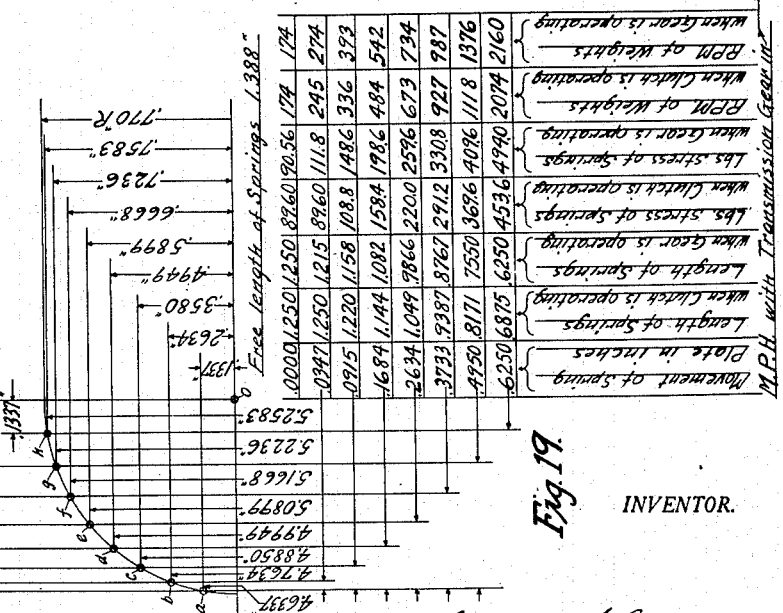

Fig. 19 is a diagram showing the action of the centrifugal weights of the auxiliary engine clutch as the weights swing outwardly about their hinge pins to different angular positions, the diagram giving the amount of shortening of the clutch engaging springs per unit of angular movement of the weights, the stress due to said shortening, and the R. P. M. required of the weights to produce the given clutch engaging stresses through the leverages available.

Figure 18:
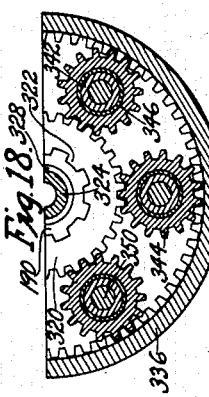
Fig. 18 is a transverse half section, taken at 18—18 of Fig. 1, showing the reversing gears.
Figure 17:
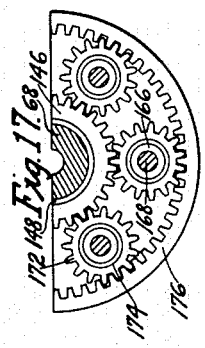
Fig. 17 is a transverse half section, taken at 17—17 of Fig. 1, showing the transmission gears.
Figure 20:
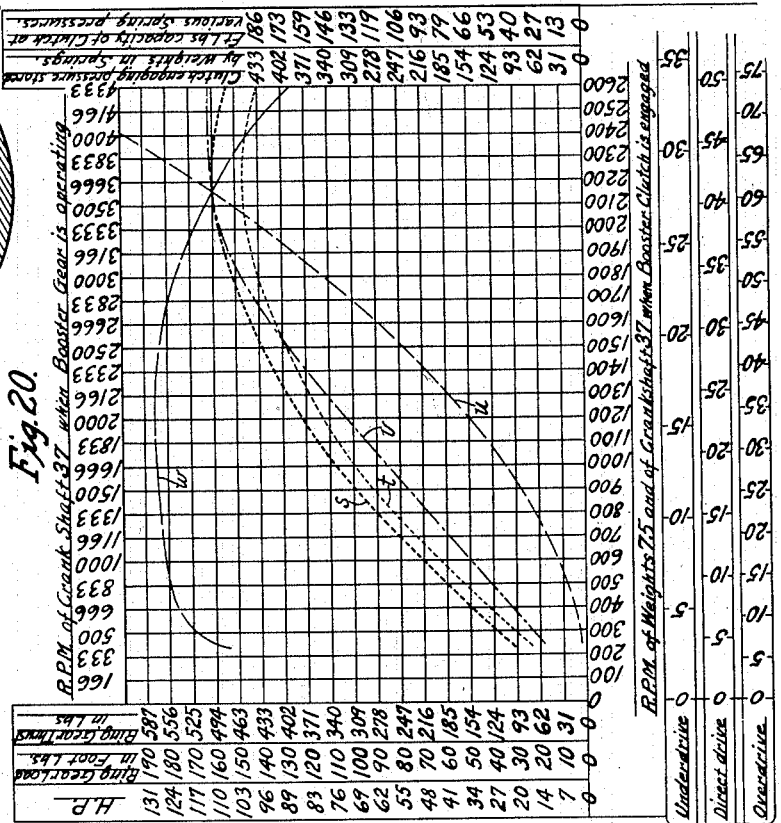

Fig. 20 is a curve chart, plotted from Fig. 19, showing the available engine power at any speed, and what portion of the power available at any given speed may be applied at that speed without bringing the booster gear into action, the booster gear coming into action with progressively less power application as the engine speed is lower and the torque output less. It also shows, by comparison, the difference in result obtainable when centrifugal force is applied through a progressively less effective leverage as compared with direct application.

Construction

The clutch housing 26 may be secured to the engine 28 in any suitable manner. A booster gear housing 29 is formed integral with the clutch housing by depressing the rear wall thereof. The transmission gear housing 30 is secured to the clutch housing by the screws 31. A partition 32 is interposed between the open ends of the booster gear housing 29 and the transmission gear housing 30. The reverse gear housing 33 is integral with the transmission housing 30, a partition wall 34 separating them. The rear bearing head 35 is held to the housing 33 by screws 36.

Secured to the crankshaft 37 by bolts 38 is the flywheel 39, the rim 40 of which has internal splines 42 to which the external splines of the main clutch backing plate 43 and pressure plate 44 are slidably fitted. A spring ring 45 in a groove in the rim 40 limits forward movement of the backing plate 43.

The main clutch frame 46 is secured to the flywheel rim 40 by screws 48 and carries a series of hinge ears 49 (see Fig. 15) to which the main clutch weights 50 (see Fig. 3) are swingably held by hinge pins 52. Pressure plate 44 has a series of pins 53 which extend through holes in the frame 46, the ends of the pins touching the upper front face of the weights.

A second series of pins 54 carried by the pressure plate 44 have their rear ends bearing against the lower front face of the weights. Midway between adjacent weights 50 are a series of hubs 55. Pressure plate 44 has a series of studs 56 extending through the frame 46 and fitting it closely but slidably.

The hubs 55 are counterbored to receive the springs 58. Collars 59 held on the free end of the studs 56 by nuts 60 fit the counterbored part of the hub closely but slidably and hold the springs 58 under an initial tension. The close fitting studs 56 and collars 59 serve as guides to restrain one side of the pressure plate 44 moving ahead of the other and consequently cause the weights 50 to move out in unison.

The clutch plate 62 is faced with a commercial dry clutch facing 63. The inner diameter of the plate is flanged at 64 and carries the studs 65 and rollers 66 through which the plate transmits its power when eclamped between the backing plate 43 and pressure plate 44. The main clutch may be broadly designated by the numeral 70.

The transmission input shaft 68 has external splines 69 over which the internally splined hub 72 of the auxiliary clutch frame 73 is fitted.

The clutch frame 73 is provided with pairs of hinge ears 74 between which the weights 75 of the auxiliary clutch (see Fig. 2) are swingably supported by the hinge pins 76. Each weight has a pair of hubs 78 on a reduced outer end of each of which a roller 79 is rotatable. The rollers are held in place by washers 80 which are held on the reduced end by riveting. The ears 74 are so shaped on their outer edges as to provide a stop for the hubs 78 to limit inward swinging of the weights.

The auxiliary clutch pressure plate 82 has a hub 83 slidable axially over the hub 72 of the clutch frame. A series of guide studs 84 are held angularly spaced in the pressure plate 82 by the nuts 85. The studs 84 are hollowed for lightness only.

A spring compressing plate 86 has a series of hubs 88 extending forwardly, one hub extending between each pair of ears 74 of the clutch frame, and a series of Y shaped portions 89 extending outwardly, each prong 90 of a Y lying immediately in back of and in contact with a roller 79.

The hubs 88 are bored at their outer ends to fit over the guide studs 84 closely but slidably, then counterbored to receive the springs 92, the enlarged outer ends 93 of the studs 84 being slidably fitted to the counterbores. The clutch plate 94 is faced with linings 95 similar to the main clutch plate 62 and has external teeth 96 which fit slidably in the internal splines 98 of the flywheel rim 40. The auxiliary clutch may be broadly designated by the numeral 100.

The booster gear set which is contained in the housing 29 and enclosed therein by the partition 32, comprises a planet pinion carrier 99, the hub 102 of which is internally splined to fit over the external splines 103 of the transmission input shaft 68. The carrier 99 has a series of angularly spaced studs 104 each of which has rotatable thereon a planet pinion 105 provided with a bearing bushing 106.

A sun gear 108 having a bearing bushing 109 is freely rotatable on the outside of the hub 102 and has integral therewith the inner member 110 of a roller brake with which rollers 112 and outer ring 113 cooperate to prevent backward rotation of the sun gear, the usual springs 111 and plungers 117 being provided to urge the rollers toward operative position. By backward rotation is meant anticlockwise when viewed from the left of Fig. 1.

The sun gear is in constant mesh with the planet pinions. The roller brake may be broadly designated by the numeral 107.

The ring gear 114, also in constant mesh with the planet pinions, has a forwardly extending hub 115 provided with a bearing bushing 116 which is freely rotatable on the transmission input shaft 68. A ring gear driving member 118 has a rearwardly extending hub 119 also fitted over the bearing bushing 116. The hubs 115 and 119 are end splined together at 120.

The booster gear housing 29 has a forwardly extending hub 122 provided with a bearing bushing 123 in which the hubs 115 and 119 are runningly fitted. The forward end of the hub 122 is enlarged to contain the annular groove 124 which catches any oil escaping from the end of the bushing 123 and conveys it through the tube 125 to a groove 126 and thereby to the outside. An oil throw rib 128, formed on the ring gear driving member 118 assists in confining the leakage oil to the groove 124.

A second annular groove 129 is formed in the ring gear driving member 118, this second groove being provided to collect any oil which may escape between the shaft 68 and the bushing 116. Small holes 130 are provided to transfer any oil collected in the groove 129 to the groove 124.

An end thrust bearing ring 132 is preferably made from graphite impregnated bearing metal such as is now commercially available for clutch thrust bearings. The ring 132 has an oil throw rib 133 around it which assists in throwing off the escaped oil.

A circular row of shouldered pins 134 are secured in the ring 132 and are freely slidable through holes in the auxiliary clutch frame 73, their ends normally bearing against the end of the hub 83 of the auxiliary clutch pressure plate.

The ring gear driving member 118 has a rim 135 the outside of which is provided at suitably spaced intervals with slots 136 which extend entirely through the rim. Slots 136 fit over the rollers 66 closely but runningly, whereby the driving member 118 may shift axially with respect to the clutch plate 62 while under load.

A shoulder 138 on the splines 103 secures the carrier 99 against axial movement on the shaft 68. A small bronze washer 139 takes any slight rearward end thrust which the carrier may have, the carrier being, of course, balanced against axial movement between the axially rearward thrust on the sun gear and the axially forward thrust on the ring gear. The sun gear needs no thrust washer inasmuch as it never rotates while under load.

A bronze washer 140 limits forward movement of the ring gear to the position shown, its rearward movement being arrested when the space 141 is taken up. A thrust washer 142 as well as the bearing bushing 143 which rotatably supports the forward end of the shaft 68 may preferably be made of graphite impregnated bearing metal. The rear end of the shaft 68 is rotatable in a bearing bushing 144 press fitted into the hub of the transmission output member 145.

Midway of the partitions 32 and 34 in the housing 30 is the transmission gear set which provides an underdrive, a direct, and an overdrive ratio. The sun gear 146 has a long bearing bushing 148 press fitted therein, the transmission input shaft 68 being runningly fitted in this bushing. A hub 152 extends rearwardly from the partition plate 32 and a bushing 154 is press fitted into this hub. The sun gear 146 and the hub 152 of the partition member are end splined together at 156 whereby the sun gear is positively held against rotation at all times.

The planet pinion carrier of the transmission gear set comprises a front bearing member 158 provided with a bearing bushing 160, and a rear bearing member 162 provided with a bearing bushing 164. Planet pinion bearing hubs 166 hold the carrier bearing members axially spaced apart, and the bolts 168 and nuts 170 extending through the carrier bearing members and the pinion bearing hubs hold the carrier parts together.

Planet pinions 172 having bearing bushings 174 are rotatable on the bearing hubs 166, the pinions being in constant mesh with the sun gear 146.

The ring gear 176 is in constant mesh with the planet pinions 172. Its front bearing member 178 and its rear bearing member 180 are secured to the ring gear by bolts 182 and nuts 184. Clearance openings 185 make room for the nuts and a wrench to apply same. The front bearing member 178 is provided with a bearing bushing 186 and the rear bearing member 180 with a bearing bushing 188. These bearing bushings enable the ring gear to rotate in concentric relation with the sun gear, but carry no radial load except the weight of the several parts.

The output member 145 of the transmission gear set has a rearwardly extending hub 190 rotatable in the ball bearing 192, held in the partition 34, the front end being closed by the bearing head 194 secured in place by the screws 196. The bearing head 194 is provided with a bearing bushing 198. An end thrust washer 195 limits axial movement.

For convenience in further description, the ring gear 176, its bearing heads 178 and 180, its bolts 182, and nuts 184 and its bearing bushings 186 and 188 may be called the ring gear element and may be broadly designated as such by the numeral 200. End thrust washers 197 and 199 limit axial movement of the ring gear element. For the same reason, the planet pinion carrier front bearing member 158 and rear bearing member 162 with their bearing bushings 160 and 164, and the planet pinion bearing hubs 166 with their bolts 168 and nuts 170 may be called the carrier element, and as such may be broadly designated by the numeral 202. End thrust washers 201 and 203 limit axial movement of the carrier element.

Obviously, with the sun gear 146 permanently held from rotating by the end splines 156 as hereinbefore described, if the ring gear element 200 is rotated, the carrier element 202 will rotate in the same direction but at less speed, and if the carrier element is rotated, the ring gear element will rotate in the same direction but at greater speed. The ring gear element will under all conditions, rotate faster than the carrier element.

It follows that, if the input member of the transmission gear set is connected to the ring gear element, and the output member to the carrier element, an underdrive ratio will be provided wherein the output member will rotate more slowly than the input member.

Conversely, if the input member is connected to the carrier element, and the output member to the ring gear element, an overdrive ratio will be provided wherein the output member will rotate faster than the input member.

On the other hand, if both the input member and the output member are connected at the same time to the same element, a direct drive will be provided wherein the input member and output member revolve at the same speed. Both members in this case may preferably be connected to the ring gear element for then the carrier element merely rotates idly at sub engine speed as does the countershaft of a conventional synchromesh transmission during direct drive.

Of course, a direct drive may be had by connecting the input member and the output member both at the same time to the carrier element, but in that case the ring gear element will rotate idly at super engine speed, which is less desirable.

It will now be apparent that, with the single planetary gear train, arranged as shown, an underdrive ratio, a direct drive ratio, and an overdrive ratio may be had by providing the input and the output members each with a clutch which will, each at its own proper time, take hold of one of the rotating element, i. e., ring gear element or carrier element, and let go of the other.

Accordingly, two clutches are provided. The clutch on the output member has one pair of pawls normally engaging the carrier element and a second pair of normally idle pawls which may become operative above a predetermined speed to first engage the ring gear element then release the first pair of pawls from the carrier element. The clutch on the input member has one pair of pawls normally engaging the ring gear element and another pair of normally idle pawls which may become operative above a higher predetermined speed to first engage the carrier element then release the one pair of pawls from the ring gear element.

The clutch which is carried by the output member, and which functions to shift from an underdrive ratio to a direct drive ratio may be for greater convenience in further description called the direct drive clutch and may be broadly designated by the numeral 204. The other clutch which is carried by the input member, and which functions to shift from a direct drive ratio to an overdrive ratio, may for a like reason be called the overdrive clutch and may be broadly designated by the numeral 206.

To facilitate description of the assembled views, the parts which cooperate to clutch the carrier element will be provided with the sub-letter "c" and those which cooperate to clutch the ring gear element will have the sub-letter "r."

The means provided on the ring gear element for the direct drive clutch 204 to engage comprises a ridge 208 formed integrally on the inside of the ring gear bearing member 178 (see Fig. 1) having two opposite notches 210r cut clear through the corner of the bearing member (see Fig. 8) and two spiral curves 212r connecting the edges of one notch to the edges of the other. The two spirals 212r comprise a two toothed ratchet which for convenience in further description may be termed the ring gear ratchet 212r. The means provided on the carrier element for this same clutch 204 to engage comprises a dish shaped rim 214 extending from the carrier bearing member 158 (see Fig. 1) having two opposite notches 216c (see Fig. 10) and two spiral curves 218c connecting the edges of one notch to the edges of the other. The two spirals 218c comprise a two toothed ratchet which may be called the carrier ratchet 218c.

The means provided on the ring gear element for the overdrive clutch 206 to engage, comprises a ridge 220 formed integrally with the ring gear bearing member 180 (see Fig. 1) having two opposite notches 222r cut clear through the corner (see Fig. 14) and two spiral curves 224r connecting the edges of one notch to the edges of the other. The two spirals 224r comprise a two toothed ratchet which may be called the ring gear ratchet 224r. The means provided on the carrier element for the same clutch 206 to engage, comprises a dish shaped rim 226 extending from the carrier bearing member 162 (see Fig. 1) having two opposite notches 228c (see Fig. 14) and two spiral curves 230c connecting the edges of one notch to the edges of the other. The two spirals 230c comprise a two toothed ratchet which may be called the carrier ratchet 230c.

For the direct drive clutch 204 there is provided a frame 232, shown in detail perspective in Fig. 5. Frame 232 has a hub 234 with end splines 236 which enter spaces between corresponding end splines in the rear end of the hub of the output member bearing head 194 (see Fig. 1). The clutch frame 232, therefore must always rotate in unison with the output member 145.

At the rear end of the hub 234 is a disc 238 which has extending therefrom a series of guide lugs 240 and 242 and a pair of spring lugs 244. The hub 234, disc 238, lugs 240, 242, and 244 are preferably integral.

Radially slidable between each pair of lugs 242 is a centrifugally operative weight 246, shown in detail perspective in Fig. 6. Each weight comprises a body part 248 just wide enough to slide freely between the lugs 242 and exactly as thick as the lugs are high. The lips 250 act as stops to limit radially outward movement of the weights when the lips engage the inner edges of the lugs 242 (see Fig. 8). At the outer edge the body of the weight is thinner as at 252 so that this part of the weight may extend between the rib 208 and the rim 214 when the weights are moved radially outward by centrifugal force. A central opening 254 contains the spring 256 which reacts against the lugs 244 to hold the weight to its inner position. One side of the body 248 is notched as at 258 to provide a place for the lug 244 to enter when the weight moves out.

Each weight 246 has integrally depending therefrom a pawl control arm 260 (see Figs. 6 and 9) having two spring plunger lugs 262 and 264 and two pawl operating lugs 266 and 268.

The lugs 262 and 264 are bored at 270 and 272 to slidably receive the spring plungers 274 and 276 (see Fig. 9). The plungers 274 and 276 have flanges 278 and 280 which are held against the lugs by a pawl shifting spring 282. Each arm 260 has a slot 284 across its front edge and a ring 286, freely rotatable on the clutch frame hub 234, has ears 288 extending into the slots. The ring 286 is not as wide as the weights are thick, a part being cut away to permit a longer bearing bushing 186. This weight and ring arrangement prevents one weight 246 being moved outwardly by centrifugal force ahead of the other, thereby preventing an unbalanced condition which would exist should one weight be momentarily out while the other is still in.

Four pawls 290, shown in detail perspective in Fig. 7, are freely slidable in the clutch frame 232 between lugs 240 and 242. Since the pawls which clutch the carrier element and those which clutch the ring gear element are exact duplicates, the sub-letters "c" and "r" are not applied in the detail view Fig. 7. A pawl adapted to clutch one of the elements is merely turned upside down with respect to the other to adapt it to clutch the other element. Referring to Fig. 7, each pawl comprises a body part 292 having three lugs 294, 296, and 298 integral. The lugs 298 have holes 300 (not shown in Fig. 7) in the one side for a small spring 302. The working end only of each pawl, that is, the end 304 is narrowed to fit the notches 210r and 216c. The other end is merely rounded to clear the parts surrounding it.

In the assembly of the direct drive clutch 204 (see Figs. 10 and 13), the two pawls 290 which are adapted to engage the carrier element appear closest to the observer with the plain sides of their bodies 292 upward between pairs of lugs 240 and 242, the lugs 294c, 296c and 298 extending downward.

The other pair of pawls 290 have their bodies 292 farthest from the observer and the lugs 294r, 296r, and 298 extending upward, the ends of the lugs of one pawl touching the body of the other, thereby leaving space between the pawls for the pawl control arm 260 of the weight. The springs 256 and 282 and the plungers 274 and 276 and the ring 286 are preferably assembled with the weights and the pawls laid on opposite sides of the control arms and the whole entered into the clutch frame. The small springs 302 may then be inserted in the holes 300 of the lugs 298 whereupon the clutch will be ready to slide over the hub of the sun gear 146. It will be observed that when a pair of pawls is assembled in the frame 232 with their lugs extending toward each other as described (see Fig. 13) their combined thickness will be the same as the height of the lugs 240 and 242 on the frame. Also, the height of the lugs 294 and 296 on the pawls (see Fig. 7) is the same as the thickness of the control arm 260 of the weight. Further, the thickness of the body 292 of two pawls plus the thickness of the control arm 260 equals the height of the frame lugs 240, 242, which is equal to the thickness of the weight body 248.

The control arm 260 is therefore always slidable between two pawls by the weights, whereby the control arm may positively move either of the two pawls to some extent by the operating lugs 266c or 268r acting against the pawl lugs 294c or 294r, and may resiliently move either of the two pawls to a greater extent by the spring plungers 274 and 276 acting against the pawl lugs 296r and 296c.

The overdrive clutch 206 is substantially like the direct drive clutch 204 just described, except that it is required to be modified to include a resilient detent mechanism which helps to hold the weights at their "in" position when they are in and helps to hold them at their "out" position when they are out. The reason why such a detent mechanism is required to control the weights when they are being revolved by the input member and are not required when they are being revolved by the output member will appear when the operation of the mechanism is hereinafter described. Since this clutch becomes operative at a much higher speed than the underdrive clutch, the weights are lighter and the springs stronger.

The transverse section Fig. 14 best shows the modifications in the overdrive clutch. The clutch frame has a hub 305 internally splined to fit over the external splines 307 of the input shaft 68. The disc 309 carries a series of lugs as before. The four lugs 240 and two of the lugs 242 are the same as in the direct drive clutch. The other two lugs 306 are made thicker and are drilled for the detent springs 308 and balls 310. The body 311 of the weight is of such width as to be received slidably between a lug 306 and a lug 242, one edge of the body having two pockets 312 and 314 to receive the ball 310, the first for the "in" position of the weights and the other for the "out" position.

A spring 316 in a pocket 318 and reacting against a lug 319 on the clutch frame, holds the weights to the "in" position. The plungers 274 and 276 are identical with those in the underdrive clutch.

The springs 321 are of heavier wire than those of the underdrive clutch but the springs 302 are identical. The remaining parts of the overdrive clutch 206 are substantially the same both in construction and operation as the direct drive clutch 204. It should be noted, however, that the two carrier bearing members 158 and 162 face in opposite axial directions, and therefore, in order that their spiral curves 218c and 230c may be the same relative to the direction of running, the spirals must be of opposite "hand" when the two carrier bearing members are unassembled and with their flanges facing in the same direction. The same applies to the two ring gear bearing members 178 and 180. Their spirals 212r and 224r are alike in "hand" when assembled as shown but opposite when the members are unassembled and their open ends facing in the same direction.

As a further difference, the four pawls 290 Fig. 7, when adapted for the overdrive clutch must have all lugs extending downwardly from the body instead of upwardly as shown in Fig. 7. This is a requirement because, in the direct drive clutch 204, the notches drive the pawls, and in the overdrive clutch, the pawls drive the notches. Furthermore, the direct drive clutch normally engages the carrier but shifts to engage the ring gear, while the overdrive clutch normally engages the ring gear but shifts to engage the carrier.

The transmission gear set herein shown and described is substantially contained in my co-pending application Serial No. 239,224, filed Nov. 7, 1938, and is herein included only because of its close cooperation with the booster gear and engine clutches shown and claimed herein.

The long hub 190 of the output member 145 extends rearwardly into the reversing gear compartment. The reversing sun gear 320 has internal splines 322 which fit corresponding splines on the hub. The tail shaft 324 is rotatably supported at the rear end by the ball bearing 326 held in the bearing head 35, and at the front end by the bearing bushing 328 which is press fitted in the rear end of the hub. The larger diameter of the tail shaft 324 abuts the rear end of the sun gear 320 and thereby prevents the sun gear moving axially.

The ball bearing is held on the tail shaft by the screw 330 acting through intermediate parts 332 and 334. The ring gear 336 is shown integral with the tail shaft 324 but may be made separately and permanently secured thereto.

The reversing planet pinion carrier 338 is provided interiorly with the bearing bushing 340 within which the hub of the sun gear 320 may rotate. Integral hollow hubs 342 extend toward each other to rotatably support the planet pinions 344 in constant mesh with both the sun gear 320 and ring gear 336. The pinions 344 are provided with bearing bushings 346 which are rotatable on the hubs 342. A carrier rear bearing member 348 is held to the carrier 338 by the bolts 350. A bearing bushing 352 is press fitted into the member 348 and the tail shaft 324 is rotatable in the bushing.

Near the forward end, the carrier 338 is grooved for the shifting collar 354. At the extreme forward end, the carrier has external teeth 356 adapted to fit slidably into the internal teeth of the plate 358, the plate 358 being secured to the partition 34 by the rivets 360. The carrier has also internal teeth 362 adapted to fit slidably over the teeth of the sun gear 320.

A forward and reverse shifting fork 364 (see Fig. 16) has two studs 365 extending radially into openings in the shifting collar 354. One side of fork 364 is swingable on the bearing stud 366 which is screwed into the hub 368 in the housing 33. A bushing 370 is press fitted into the fork and runningly fitted over the stud 366. The other side of the fork is internally splined at 372 for the external splines of the reversing lever 374, which is rotatable in the hub 376 of the housing 33.

A beveled valve like seat 377 in the outer end of the hub 376 and a correspondingly beveled shoulder on the reversing lever 374 is intended to prevent leakage of lubricant from the housing. A detent bracket 378 is held to the housing 33 by screws 380. A detent ball 382 is pressed by a detent spring 384 into a seat 386 suitably positioned for forward, neutral, and reverse positions of the lever 374. A spring 388 keeps the beveled shoulder of the lever 374 against the beveled seat 377.

The lower end of the lever 374 is provided with a hub 390 to which any suitable operating means may be attached and extended to a position convenient for the operator.

The reversing mechanism just described is shown in my copending application Serial No. 180,174 and 239,224, filed Dec. 16, 1937 and Nov. 7, 1938, respectively, and is included herein only to provide a complete operative mechanism.

Proportion

While the structure shown may be proportional for use with an engine of any horsepower and with any vehicle weight within reason, some suggestion as to proportion, and procedure in obtaining same for a given vehicle, may preferably be given.

If the largest diameter of the clutch housing 26 is taken as 15½ inches and all other parts made to the same scale, the mechanism will be suitable for an engine delivering 110 H. P. at 3600 R. P. M. in a vehicle of approximately 3500 pounds weight.

In the reverse gear set where quiet operation and long wear is not the prime consideration, a stub tooth design is advisable for strength. The gearing selected is 12–14 stub tooth 20 degree pressure angle, straight spur teeth. The ring gear has 60 teeth on a pitch diameter of 5 inches, the sun gear 30 teeth on a pitch diameter of 2½ inches and the planet pinions 15 teeth on a pitch diameter of 1¼ inches.

The sun gear is the driver, the ring gear the driven, and the carrier is stationary. The ratio, through the reversing gears only is therefore $$\frac{R}{S}=\frac{60}{30}=2 \text{ input revolutions forward}$$

to one output revolution backward.

For the transmission gear set the gearing selected is 14 pitch, 20 degree pressure angle, 14 degree helix angle. The ring gear has 57 teeth on a pitch diameter of 4.196 inches, the sun gear 27 teeth on a pitch diameter of 1.988 inches, and the planet pinions 15 teeth on a pitch diameter of 1.104 inches.

The ratio through the transmission gear set only, at low speed and before either transmission clutch has operated is therefore $$\frac{R+S}{R}=\frac{57+27}{57}=1.474 \text{ input revolutions}$$

to one output revolution, the ratio after the first transmission clutch has operated will, of course, be one input revolution to one output revolution, and the ratio after the second transmission clutch has operated will be $$\frac{R}{R+S}=\frac{57}{57+27}=0.6786 \text{ input revolution}$$

to one output revolution.

For the booster gear set the gearing selected is 16 pitch 20 degree pressure angle and 35 degree helix angle. The "hand" of the internal teeth in the ring gear should correspond in direction to the threads of a left hand nut. The ring gear has 72 teeth on a pitch diameter of 5.4936 inches, the sun gear 48 teeth on a pitch diameter of 3.6624 inches, and the planet pinions 12 teeth on a pitch diameter of 0.9156 inch. The helix angle of the teeth of the booster gear set must be determined in accordance with the size and engaging pressure of the auxiliary engine clutch, as will later appear.

The ratio through the booster gear set only, is therefore $$\frac{R+S}{R}=\frac{72+48}{72}=1.6666 \text{ input revolutions}$$

to one output revolution.

With the engine power and vehicle weight selected as 110 H. P. and 3500 pounds respectively, for illustrative purposes, the rear axle ratio may preferably be 4.666 to 1. The six forward ratios obtainable will then be, Ratios = booster × transmission × axle = engine to wheel
| | | | | |
|---|---|---|---|---|
| 1 | 1.666 × | 1.474 | ×4.666 = | 11.46 to 1 |
| 2 | 1.666 × | 1.000 | ×4.666 = | 7.78 to 1 |
| 3 | 1.000 × | 1.474 | ×4.666 = | 6.88 to 1 |
| 4 | 1.666 × | 0.6786 | ×4.666 = | 5.24 to 1 |
| 5 | 1.000 × | 1.000 | ×4.666 = | 4.67 to 1 |
| 6 | 1.000 × | 0.6786 | ×4.666 = | 3.17 to 1 | and the two reverse ratios will be,

Ratios = booster × trans- × reverse × axle = engine to wheel
mission
| | | | | | |
|---|---|---|---|---|---|
| 1 | 1.000 × | 1.474 | × 2.000 | ×4.666 = | 13.75 to 1 |
| 2 | 1.666 × | 1.474 | × 2.000 | ×4.666 = | 22.92 to 1 |

The size of the centrifugal weights which operate the positive clutches in the transmission gear box may be made to the scale indicated, but the springs associated therewith will govern the vehicle speeds at which these clutches will act. Based on 30 inch wheels a speed of 16 M. P. H. is selected for the shift of the clutch 204 to change the transmission gear set from underdrive to direct, and a speed of 36 M. P. H. for the shift of the clutch 206 to change from direct to overdrive. With these speeds selected, the springs will necessarily be as follows:

Springs 256 should be made of .054 inch round wire coiled ½ inch pitch diameter, have 14 coils and a free length of 3.72 inches.

Springs 282 should be made of .032 inch round wire coiled ⅜ inch pitch diameter, have 24 coils and a free length of 4.56 inches.

Springs 316 should be made of .072 inch round wire coiled ⅝ inch pitch diameter, have 12 coils and a free length of 3 inches.

Springs 321 should be made of .041 inch round wire coiled ⅜ inch pitch diameter, have 18 coils and a free length of 2.63 inches.

Springs 302 may be made of .020 inch round wire coiled $\frac{5}{32}$ inch pitch diameter with such length and pitch as will provide a stress of about 2 pounds when in place.

With springs of the above dimensions, the shift back from overdrive to direct will take place at 30 M. P. H. and the shift back from direct to underdrive at 12.3 M. P. H.

The proportion of the main engine clutch 70 presents no intricate problem. The torque which a dry plate clutch of a given diameter and under a given engaging pressure will transmit is fairly well established. Having selected the largest diameter conveniently contained in the space available, and determined the engaging pressure needed to transmit the torque of the engine designated, the weights 50 may be readily determined. They may be found in the instant case by scaling the drawing. The springs 58 which restrain the weights 50 should, however, be so proportioned that they will oppose and prevent the weights applying sufficient pressure to carry the full engine torque until the engine is revolving at a speed at which it can deliver substantially its full torque. The springs 58 are so proportioned that they oppose the weight force to such an extent that, while the clutch first engages with light pressure at 400 engine R. P. M. it does not engage with maximum pressure until the engine reaches a speed of approximately 800 R. P. M., which makes for a more gentle engagement.

The springs, to balance the weights to this extent, should preferably be made of .072 inch round wire, coiled ⅝ inch pitch diameter with 9 coils and have a free length of 2.18 inches.

The proportioning of the auxiliary engine clutch 100 is more involved than that of the main clutch. Having selected the largest dry plate which will go in the space available, the engaging pressure which will carry the full torque of the engine selected is tentatively determined. In the instant case, this will be around 430 pounds.

To obtain a proper overlap between shift up and shift down in the booster gear, the axial thrust of the ring gear 114 should be about 15% greater than the maximum required clutch engaging pressure, or 1.15×430=495 pounds. The helix angle of the teeth is then determined by selecting the nearest even angle which will produce approximately 495 pounds axial thrust when transmitting the foot pounds torque which the engine can deliver at its maximum H. P. speed.

In Fig. 20 of the drawings the curve $w$ shows the torque curve, and the curve $v$ the H. P. curve of an engine of 110 H. P. at 3600 R. P. M., and while the maximum torque is seen to be 186 foot pounds, the torque at 3600 R. P. M. or maximum H. P. point is only 160 foot pounds. The helix angle of the booster ring gear is therefore selected at 35 degrees, and the axial thrust which will occur at maximum H. P. point, that is, at 160 foot pounds torque will be 494 pounds. This axial thrust of the ring gear will be forward, i. e., toward the engine.

The springs 92 are now so proportioned that when the weights 75 compress them to the shortest length, that is, when the weights reach the "clear out" position, the stress in the eight springs will be 494 pounds or just equal to the axial thrust of the ring gear 114. The springs 92 should therefore be made of .120 inch round wire coiled ⅞ inch pitch diameter, have five coils and a free length of 1.39 inches. When in place and with the weights 75 "clear in" as shown in Fig. 1 they are 1¼ inches long and the eight springs together are under a stress of 90 pounds. When the weights are "clear out" the springs are ⅝ inch long and the eight together are under a stress of 494 pounds.

The weights 75 are now so proportioned that when they are in their "clear out" position they will be holding the spring to a ⅝ inch length or 494 pounds stress, the mass of the weights being such that they will have the requisite force when rotating 2160 R. P. M. which is the speed of the weights when driven through the booster gear by the engine rotating 3600 R. P. M. i. e., the point of maximum H. P.

It follows that if the maximum torque of the engine designated were being transmitted through the booster gear, and the vehicle speed was constantly increased thereby, the stress of the springs would reach 494 pounds at 3600 R. P. M. of the engine and since 494 pounds was the ring gear thrust at 3600 R. P. M. any increase in engine speed would lower its torque below 160 foot pounds (see curve $w$) which would at once result in the springs 92 overcoming the ring gear thrust and the auxiliary clutch 100 would be engaged.

Now while the application of the maximum possible torque to the booster ring gear kept the auxiliary clutch from engaging, and thus kept the booster gear operating up to 3600 engine R. P. M., a lesser torque application will keep the booster gear operating up to a lesser engine speed.

If, however, the centrifugal weights 75 were of conventional design and applied their clutch engaging force directly, or through an unvarying leverage, it would be unlikely that engagement of the clutch 100 would ever be enforced against the ring gear thrust at any relatively low speed for the following reason:

Centrifugal force varies with the square of the R. P. M. so that, if the weights 75 were arranged conventionally, and were just given enough mass to provide the necessary 494 pounds force at 3600 engine R. P. M. then the curve $u$ Fig. 20, would represent the force at less R. P. M. From the curve $u$ it will be seen that a conventional weight arrangement which will produce 494 pounds at 3600 engine R. P. M., will at 1200 engine R. P. M., i. e., ⅓ the speed produce only ⅑ the force. It is obvious that, at low driving speeds, it would be impossible to eliminate the booster gear without reducing the applied torque to a value too low for successful operation. The proportioning and arrangement of the weight mechanism shown obviates the foregoing difficulty.

Fig. 1 shows a weight 75 in place and in the "clear in" position. A line drawn through the hinge pin 76 and the roller 79 which is at the center of gravity is at an angle of 10 degrees with the transmission axis.

When the weight reaches the "clear out" position, i. e., when it has shortened the springs 92 to half the length shown, the same line will be at an angle of 80 degrees with the transmission axis.

Obviously, if the weight were allowed to swing out until the above mentioned line was 90 degrees with the transmission axis no amount of increase in speed would further increase the force applied to compress the springs 92.

Fig. 19 shows diagrammatically the constantly diminishing leverage through which the weights 75 apply their force to the springs 92 as the weights swing outward. The point $o$ represents the center of a hinge pin 76. The points $a$, $b$, $c$, $d$, $e$, $f$, $g$, and $h$ represent the center of a roller 79 which is the center of gravity of the effective mass of the weight at 10, 20, 30, 40, 50, 60, 70, and 80 degrees outward movement.

Obviously, since the centrifugal force is radial and the force of the resisting springs is axial, the effective leverage, through which the centrifugal force is applied to the spring resistance at any point from $a$ to $h$ will be the $$\frac{\text{cosine}}{\text{sine}}$$

of the angle with the axis or $$\frac{\text{sine}}{\text{cosine}}$$

of the angle with a radius.

The radius between the hinge pin 76 and the roller 79 is .770 inch. The diagram therefore has tabulated the sines and cosines of the angles 10 to 80 degrees times .770 inch.

The difference between the cosine 10 degrees

× .770 and the cosine 20 degrees ×.770 will of course be the movement of the spring compressing plate 86 caused by movement of the roller 79 from $a$ to $b$. In the table this is .0347 inch. In like manner the total movement of the plate 86 is tabulated for each position from $a$ to $h$.

From the dimensions representing the movement of the spring compressing plate, the length of the springs with weights at points $a$ to $h$ may be found. Since the spring lengths are slightly different for any point when the clutch 100 is engaged than they are when it is disengaged, one column shows the length of the spring when the clutch is operating and the next the length when the booster gear is operating. The next two columns show the pounds stress stored in the springs at the several spring lengths.

Having the spring stress which the weights must overcome to reach any point $a$ to $h$ and the distance from the axis of the transmission to each point, and the leverage $$\frac{\text{cos. angle with axis}}{\text{sin. angle with axis}}$$

through which the centrifugal force must act on the weights at each point, the R. P. M. at which the weights will reach any given point may be readily calculated. One column shows the R. P. M. at which the weights reach points $a$ to $h$ when the clutch 100 is operating and another column the R. P. M. when the booster gear is operating.

From the latter two columns the curves $t$ and $s$ respectively Fig. 20 are plotted. The curve $s$ shows that at 3600 engine R. P. M. the weights 75 will stress the springs 92 with a force of 494 pounds while at 1200 engine R. P. M. the weights will stress the springs with a force of 252 pounds. Thus at 1200 engine R. P. M., which may be at 9, 14, or 22 M. P. H. depending on whether the transmission gear set is operating in underdrive, direct, or overdrive, it will be necessary for the operator to apply at least 83 out of the possible 183 foot pounds engine torque available at 1200 R. P. M. to prevent an enforced elimination of the booster gear.

Curve $u$ shows that, with conventional centrifugal mechanism, no shift up out of the booster gear drive could be had at 1200 engine R. P. M. unless the torque application was reduced to 17 out of a possible 183 foot pounds available. Obviously with conventional centrifugal mechanism the operator would be unable to rid himself of the booster gear even though the load conditions were light enough to make such a course desirable.

When the clutch 100 engages, the engine speed will be the same as the weight speed, and the engine speed must be taken from the figures at the bottom of the curve chart Fig. 20.

From curve $t$ and the figures at the bottom of the chart it may be seen that, if the clutch 100 is engaged, and the speed of the engine is as much as 1800 R. P. M., the springs 92 will be holding the clutch in engagement with a force of about 433 pounds which is near enough the 430 pounds tentatively established hereinbefore as suitable to enable the clutch to carry the maximum torque which the engine can produce at 1800 R. P. M.

Obviously then, if the clutch 100 is once engaged, and the engine is rotating above 1800 R. P. M., the application of even the maximum torque of which the engine is capable will not cause a shift down into booster gear. At 1000 engine R. P. M., however, (see bottom of chart) the curve $t$ shows that, if the clutch 100 is engaged and a sudden spurt of power is needed, the application of 133 foot pounds out of the 182 maximum possible foot pounds at that speed, will shift down and make available the booster gear.

Thus it will be seen that, if the booster gear is operating, it may be retained by the operator by keeping the curve of the torque he is applying anywhere above the curve $s$, but that there comes a time, at 3600 engine R. P. M., when the engine is incapable of producing torque above the curve $s$ and an enforced shift out of the booster gear will occur. This is as it should be, for there is no object in retaining a reduction gear in effect after the engine speed can rise no higher without losing power.

The booster gear is forcibly eliminated at the maximum H. P. point only when the engine is delivering maximum H. P. It will be eliminated at lower speeds whenever a lesser torque curve $w$ is being created and it falls low enough to cross the curve $s$ going downward.

Furthermore, since 433 pounds clutch engaging pressure applied by the springs 92 to the clutch, will keep it engaged under maximum or 186 foot pounds torque, it follows that 216 pounds pressure or half as much will keep it engaged under half the maximum torque or 93 foot pounds, and from curve $t$ it will be seen that 216 pounds will be supplied by the weights when the clutch is engaged and at a speed as low as 670 R. P. M. Therefore, at 670 R. P. M. the clutch may be eliminated in favor of the booster gear by the application of 93 foot pounds torque. Stated another way, at 670 engine R. P. M. with the auxiliary clutch engaged the operator may drive about 8½ M. P. H., the transmission gear set being at that speed still in underdrive, with half the total available H. P. applied without eliminating the auxiliary clutch and substituting the booster gear therefor.

*Operation*

The normal condition of the mechanism, that is, the condition which exists when the engine is at rest or is idling below 400 R. P. M. is that which is shown in the drawings, where the centrifugal weights of the main clutch 70, the auxiliary clutch 100, and the transmission clutches 204 and 206 are all in their "clear in" positions and the reversing gear set is in neutral. In this condition the engine may be run and warmed if desired.

As the engine speed rises, the clutch 70 first engages and operates the booster gear, which in turn rotates the shaft 68 which in turn operates the clutch 100. The weights of the transmission clutches also operate in and out at certain points in the rise and fall of the speeds. This limbers up not only the engine but the entire transmission mechanism. No power is transmitted because the reversing gear is in neutral.

To set the reversing gear set for moving the vehicle backwardly, the hub 390 of the reversing lever 374 is moved rearwardly, which draws the carrier 338 forwardly and engages the carrier clutch teeth 356 with the internal teeth of the clutch plate 358. When the carrier 338 is thus held non-rotative, forward rotation of the sun gear 320 will cause rearward rotation of the ring gear 336 and the vehicle will move backwardly.

For all forward driving, the hub 390 of the reversing lever 374 is drawn forwardly, which pushes the carrier 338 rearwardly until the internal clutch teeth 362 slide over the teeth of the sun gear 320.

The teeth of the planet pinions 344, being still meshed one third their length into the teeth of both the sun gear 320 and the ring gear 336, a locked up condition is provided wherein the tail shaft 324 must rotate in unison with the transmission output member 145.

If the engine is now speeded up past 400 R. P. M., the main clutch 70 engages, drives the booster ring gear 114 which starts revolving the booster sun gear 108 backwardly, which is immediately arrested by the roller brake 107, whereupon the carrier 99 rotates forwardly at reduced speed.

The carrier 99 is secured to the transmission input shaft 68, therefore both rotate at the same speed. The input shaft 68 being normally connected by the clutch 206 to the ring gear element 200 of the transmission gear set while the carrier element 202 is connected by the clutch 204 to the output member 145, both gear sets will be in series and both operating at reduced output member speed. This provides low gear or first speed and the engine to wheel ratio will be 11.46 to 1.

Now as soon as the vehicle starts moving, the auxiliary clutch 100 starts rotating, whereupon the weights 75 start moving out and compressing the engaging springs 92. There is an unvarying position of the weights and an unvarying length and stress of the springs for any given vehicle speed. Whether this stress will engage the auxiliary clutch 100 or not depends on the forward axial thrust of the booster ring gear 114. If this thrust is zero, as for instance when the vehicle is allowed to start itself on a steep down grade, the clutch 100 will engage immediately following the beginning of vehicle movement.

This is important, for it insures engine braking under any and all circumstances even when the engine is dead or idling and the main clutch 70 is disengaged. It also permits the engine to be started when the battery is dead by pushing the vehicle. Of course, after the engine is rotated through the auxiliary clutch 100 by vehicle movement to a speed of 400 R. P. M. or more, the main clutch 70 will automatically engage.

If, on the other hand, a start is being made against vehicle resistance as is substantially always the case, then the booster ring gear will thrust forward in proportion to that vehicle resistance to oppose auxiliary clutch engagement, and its engagement will be proportionately delayed.

In starting from a dead stop, the transmission gear set will always be coupled for underdrive. By consulting chart Fig. 20, it may be seen that with the transmission gear in underdrive, a speed of 5 M. P. H. may be reached without engagement of the clutch 100 and consequent elimination of the booster gear, if the operator is applying at least 33 out of a possible 110 H. P. If, at 5 M. P. H. he is applying less than 33 H. P. or purposely drops his torque to less than this value, the torque curve $w$ will fall and cross the curve $s$ and the booster gear will be eliminated and the engine to wheel ratio which was 11.46 to 1 will now be 6.88 to 1. He may now continue at this ratio up to but not beyond 28 M. P. H. (3600 engine R. P. M.) by gradually increasing the applied power. If he exceeds 28 M. P. H. a shift up out of booster gear will be involuntary.

He may also suddenly increase the applied power to a value above the curve $t$ for the then existing speed and return to first speed if he has not raised the vehicle speed past 16 M. P. H.

If the vehicle speed is exceeding 16 M. P. H. and the applied power is suddenly released, the transmission gear will change to direct drive, and the booster gear will be eliminated simultaneously. With the transmission gear in direct drive and the booster gear eliminated, the engine to wheel ratio is 4.67 to 1. This ratio may be retained by the operator if he increases his applied power gradually, or, with the transmission remaining in direct drive he may bring back the booster gear at 16 M. P. H. by applying power above the curve $t$ which at 16 M. P. H. in direct drive is about 59 H. P. If he thus brings back the booster gear with direct drive in the transmission, his engine to wheel ratio will be 7.78 to 1. But he may not hold the booster gear effective past 41 M. P. H. (3600 engine R. P. M.)

If, however, the vehicle speed is raised, gradually, without the booster gear, or rapidly with it, to a speed in excess of 36 M. P. H., the transmission gear set will shift into overdrive the first time the applied power is sufficiently lowered to cause the vehicle to drive the engine. When this occurs the shift up of the booster gear and the transmision gears will be simultaneous. The engine to wheel ratio will be 3.17 to 1. At 36 M. P. H. with the transmission gear in overdrive, the operator may already apply 80 H. P. without shifting back into booster gear. This he may increase gradually, always keeping it below the curve $t$ as the vehicle speed increases.

If, however, he is not content with the acceleration obtainable with the 3.17 to 1 ratio, he may suddenly apply power above the curve $t$ and booster gear will be momentarily returned giving an engine to wheel ratio of 5.24 to 1. This booster ratio may then be employed to raise the vehicle speed to not exceeding 61 M. P. H. (3600 engine R. P. M.) when booster gear will be forcibly eliminated. It may of course be voluntarily eliminated at any speed by allowing the torque curve $w$ to drop below the curve $s$.

Thus it will be seen that for a given speed, the auxiliary clutch 100 develops a given clutch engaging pressure and stores it in the clutch engaging springs 92. Likewise for a given applied torque, the booster ring gear 114 provides an axial thrust which transmits through the pins 134 to oppose the clutch engaging force of the springs. When the spring force outweighs the thrust, the booster gear is eliminated. When the applied torque exceeds the clutch carrying capacity at the then existing speed, the booster gear returns to operative condition. When the booster gear is operating, it assumes the axial location shown in the drawings. When the auxiliary clutch engages, the booster gear is free to move into the space 141 and permit free clutch engagement because the sun gear 108 is now revolving freely forward and does not serve as a reacting member to thrust the ring gear axially.

The transmission gearing contained in the housing 30 and the reversing gearing contained in the housing 33 have been heretofore shown in my copending application Serial No. 239,224 filed Nov. 7, 1938, and are here illustrated and described because of their close cooperation with the novel features herein disclosed. The manner in which the transmission and reversing gears operate is therefore preferably described herein The transmission input shaft 68 drives the ring gear element 200 of the transmission gear set forwardly by the pawl ends 304r (see Fig. 14) which are normally in the notches 222r of the ridge 220 (see Fig. 1), the pawl ends 304r being driven by the clutch frame 309 which is splined on the input shaft. Since the sun gear 146 is permanently fixed against rotation, the carrier element 202 will rotate forwardly at less speed than the ring gear element, the ring gear element revolving 1.474 turns to one turn of the carrier element.

The carrier element 202 drives the output member 145 by the carrier notches 216c (see Fig. 10) cut in the carrier rim 214 (see Fig. 1) which are normally over the pawl ends 304c, the pawls being held in the clutch frame 232 which is end splined at 236 to the output member head 194. Obviously, the input member normally revolves 1.474 turns to 1 turn of the output member, the pawl and notch drive being such that there is no overrunning. For engine braking when descending steep hills, the normal connections described produce a ratio which is equivalent to second gear of common practice.

At 16 M. P. H. the weights 246 have generated enough centrifugal force to start moving outwardly and do in fact move halfway out at this speed, so that the pawl operating lugs 266c encounter the pawl lugs 294c whereupon the weights stop when half way out because they can not pull the carrier pawl ends 304c out of the notches 216c against the frictional resistance between the pawl and notch caused by the pressure due to the torque load being carried. If, however, the operator inadvertently or purposely momentarily releases the applied power to lessen the pressure between the pawl ends and the slots, the weights will move the other half of the way out, as in Fig. 11, and in doing so, the lugs 266c acting against the carrier pawl lug 294c will draw the carrier pawl ends 304c half of their ultimate travel toward disengaged position, that is, when the weights move the second half of the weight travel they move the pawl ends 304c the first half of the pawl travel.

The ring gear pawl ends 304r are now urged toward engaged position in the notches 210r by the now compressed springs 282, acting against the plungers 274, which in turn act against the ring gear pawl lugs 296r. The ring gear pawls may, however, move only half of their ultimate travel because then the ring gear lugs 296r will have caught up to the carrier lugs 294c which themselves have moved only half the total travel.

The result is that the carrier pawls 304c are now located with their heels out of their respective notches but not their toes, so that instead of the carrier pawls being engaged with a positive two way drive, they are engaged with a one way ratchet drive, and while the ring gear pawls 304r are tensioned to enter full depth into their notches 210r they are at present limited to entering halfway to the ratcheting position only because the lug 296r will encounter the lug 294c.

At the instant this one way ratchet drive begins, the ring gear is rotating 1.474 turns to 1 of the carrier which is, of course. 1.474 turns of the two tooth ratchet 212r, to 1 turn of the pawl ends 304r which are spring pressed against the ratchet as it rotates. During this transition period wherein the output member is disconnected from the carrier element and ultimately connected to the ring gear element, the double ratchet drive allows the output member to rotate at any speed between that of the ring gear and that of the carrier. It may not, however, rotate faster than the ring gear nor slower than the carrier. It follows that, if the engine power is reapplied too soon, that is, when ratcheting has just begun, the carrier catches up to the output member and drives it with a one way ratchet drive, whereas before the shift started it drove it with a two way drive. If, however, after ratcheting begins, the operator waits one or two seconds until the drop in engine speed slows the ring gear down to that speed which the carrier had before, the ring gear pawl ends 304r will drop into the ring gear notches 210r and the shift from underdrive to direct drive will be completed.

When the ends 304r of the ring gear pawls thus drop into the notches 210r, the ring gear lugs 294r will necessarily act against the carrier lugs 296c and the carrier pawl ends 304c will be drawn completely from their half out ratcheting positions to fully disengaged positions. In short the lugs 294 and 296 of Fig. 7 are so placed that the carrier and ring gear pawls may never both be even slightly entered in their notches for positive drive at the same time. To enable one pawl to start in its positive drive notch, the other must be out.

Fig. 11 shows the direct drive clutch 204 in the transition period. During this period, the clutch frame and pawls, being secured to the output member, maintain a constant speed due to vehicle momentum. As the engine speed falls, the ring gear ratchet 212r rotating faster than the ring gear pawls 304r ratchets over them, while the carrier ratchet 218c rotating slower than the carrier pawls 304c ratchets over them. Fig. 11 shows the condition of the mechanism at the instant the driving effort was sufficiently released and the weights 246 moved "clear out." It will be seen that the pawl operating lugs 266c of the weights have acted against the carrier pawl lugs 294c and have thereby drawn the ends of the carrier pawls 304c from the two way drive position Fig. 10 to the ratchet drive position Fig. 11. With the same movement, the weights have put the springs 282 in compression and applied their stress through the plungers 274 and the lugs 296r to urge the ring gear pawls 304r toward engagement in their notches 210r.

In Fig. 11 the heels of the carrier pawls 304c are just about to allow the two toothed carrier ratchet 218c to move slower than the pawls by ratcheting, and the toes of the ring gear pawls 304r are just being passed by the more rapidly moving notches 210r of the ring gear ratchet 212r. The lugs 298 of the pawls are so spaced that when the highest points of both ratchets 212r and 218c pass over the toes of their respective ratchets 304r and 304c, the lugs will not come quite together. Lugs 298 will be farthest apart when the pawls are in the condition shown in Fig. 10 or 13. The small springs 302 always urge a carrier pawl and a ring gear pawl apart until they are stopped by a lug 296c abutting a lug 294r, that is, the position shown in Fig. 13, whereupon the chordal measurement across the pawls is just enough to prevent both pawls entering a positive drive notch at one and the same time. The small springs 302 are, however, only concerned with spreading the pawl ends 304c and 304r apart. They are not concerned with which direction, with respect to the ratchets, they go.

Because the weights are now in the "out" position, the heavier shifting springs 282 are also at the maximum stressed condition and these springs are acting only against the plungers 274 and lugs 296r. Their full pressure is therefore being exerted to force the pawl ends 304r into the notches 210r.

They will do so as soon as the ring gear drops to the output member speed, at which time the notches 210r and pawl ends 304r are synchronized. The lugs 294r and 296r on the ring gear pawls (see Fig. 13) will act against the lugs 294c and 296c of the carrier pawls, whereby entrance of the ends 304r of the ring gear pawls into the positive drive notches 210r may not take place until the ends 304c of the carrier pawls are drawn far enough out of the notches 216c to break the positive drive.

When the shift from underdrive to direct drive is completed as above explained, the direct drive clutch 204 will appear as in Fig. 12, where the weights are still being held clear out by centrifugal force, against the stress of the main springs 256. The shift from carrier pawl engagement to ring gear pawl engagement has relieved the stress of the shifting springs 282 as well as the small springs 302.

Now in order that the weights could move out, they had to stress both the main springs 256 and the shifting springs 282 which required a centrifugal force of about 32 pounds+8 pounds=40 pounds. After the weights are out, the main springs are shorter and their stress is increased to 36.6 pounds, but the shifting of the pawls has relieved the centrifugal force from having to stress the shifting springs. Now when the main springs move the weights back in, they must not only overcome the centrifugal force but must re-stress the shifting springs. It follows that the centrifugal force of the weights must be 32+8=40 pounds before they move out, and be reduced to 36.6—7.2=29.4 pounds before they will move back in.

By calculation it will be seen that, although the weights will move out at 16 M. P. H., they will not move back in until the vehicle speed has fallen to 12.3 M. P. H. This overlap is necessary to prevent too frequent shifts should the operator be maintaining an almost constant vehicle speed approximately the shifting speed.

As long as the direct drive clutch 204 remains in the condition shown in Fig. 12, the output member will be connected to the ring gear element, and, since the input member is normally connected to the ring gear element, a direct drive ratio is in effect, wherein both input and output members are connected to the ring gear and the carrier is connected to neither but merely rotating idly at less than engine speed.

After a speed of 36 M. P. H. is exceeded in direct drive, the overdrive clutch 206, shown in its normal condition in Fig. 14 may be shifted up in the same manner as explained relative to the direct drive clutch 204. The clutch frame 309 is rotated by the input member and the ring gear pawls 304r are normally in ring gear notches 222r, but, upon shift up, the carrier pawls 304c will enter the notches 228c. The same ratcheting will take place in the transition period.

There is, however, a difference between the operation of the direct drive clutch 204 and the overdrive clutch 206, in that, during the transition period of the direct drive clutch 204, the weights, being rotated by vehicle momentum do not lose any substantial speed, while during the transition period of the overdrive clutch, the weights, being rotated by the input member at engine speed will lose about 33% of their speed as the engine speed is let down that amount to cause the shift.

When the weights lose 33% of their speed, they lose 57% of their centrifugal force, since the force is in proportion to the square of the speed. It follows that some provision must be made to assist the centrifugal force which is left after the shift to hold the weights out, otherwise the instant the transition period was complete the weights would move back in. This assistance is provided by the detent mechanism comprising the spring 308 and ball 310 together with the pocket 312.

At 36 M. P. H., the weights 311, Fig. 14, generate 80 pounds outward force. This will overcome the main springs 316 having 52 pounds resistance, compress the shifting springs 321 having 14 pounds resistance plus 14 pounds resistance offered by the detent mechanism 308, 310, 312. When the weights move out, the stress of the main springs 316 increases from 52 pounds to 62 pounds. After the shift up, in order to shift back down, the main springs of 62 pounds must compress the shifting springs, of 14 pounds, overcome the detent mechanism of 14 pounds, which leaves only 62—28=34 pounds which must be sustained by the centrifugal force, that is, it takes 80 pounds centrifugal force to force the weights out, but only 34 pounds centrifugal force to hold them out after they are out.

By calculation it may be found that with the overdrive clutch 206 engaged, the vehicle speed must still be reduced as low as 30 M. P. H. before a shift down from overdrive to direct will take place. This overlap of 6 M. P. H. is adequate to prevent too frequent shifting.

It is not intended that the operator of a vehicle having the herein described transmission mechanism must necessarily pay any attention to the ratio in effect, because in normal driving, the power application is quite frequently varied unconsciously to an extent sufficient to cause the vehicle to drive the engine for an instant, and whenever this occurs, if the transmission gear set is not connected for the most desirable ratio, the change to the most desirable ratio will take place without the operator's knowledge. Intermediate the time of the changes in the gearing the booster gear will operate to increase or reduce the overall ratio as speed and load conditions require.

Thus, any time and with any transmission gear ratio effective, a reduction in ratio may be had through the booster gear by the application of heavy power against heavy vehicle resistance if the engine speed has not at that time reached a value which is too near its maximum, in which case the engine could not increase its speed sufficiently to drive the vehicle at the then existing speed through any lower ratio.

Engine braking will always be had at engine to wheel ratios of 6.88 to 1 if the speed is below 16 M. P. H., 4.67 to 1 if the speed is below 36 M. P. H., and 3.17 to 1 if the speed is above 36 M. P. H.

Claims in this application are confined to the mechanism within the clutch housing 26 and booster gear housing 29, claims to the transmission gear being made in my copending application Serial No. 239,224, filed Nov. 7, 1938, and hereinbefore mentioned. In the claims herein presented, the member 118 may be taken as the input member and the shaft 68 as the output member. The clutch 70 may be referred to as the main clutch and the clutch 100 as the auxiliary clutch.

I claim:

1. In a power transmitting device, an engine, a gear set having input and output members, a clutch engageable for connecting the input member to the engine, a second clutch engageable for connecting the output member to the engine directly and irrespective of whether the first clutch is engaged or disengaged speed responsive means carried by the engine and operative at engine speed for engaging the first clutch, a second speed responsive means carried by the output member and operative at output member speed for engaging the second clutch, and means responsive to torque load received by said gearing from said engine through said first clutch operative to oppose said second speed responsive means engaging said second clutch.

2. In a power transmitting device, a power source, driving and driven members, a gear set for connecting the driving and driven members for reduced speed, at least one gear being secured to the driving member, means for connecting the driving member to the power source, a clutch engageable for connecting the driven member to the power source directly and independently of its connection through said gearing, speed responsive means rotatable by the driven member for engaging said clutch, and torque responsive means including means on the driving member gear acting against the engageable member of said clutch to keep it disengaged.

3. Power transmitting mechanism comprising, an engine, a gear set having input and output members, a speed responsive clutch on the engine operative by engine speed to connect the engine to the input member, a second speed responsive clutch on the output member operative by output member speed to connect the output member to the engine directly and independently of whether the first clutch is engaged or disengaged, and helical teeth on one of said gears operative by torque load received from said engine through said first clutch to create an axial thrust and transfer it to the engaging member of the second said clutch, thereby to resist engagement in proportion to the torque being transmitted.

4. In a power transmission mechanism, a power source, driving and driven members, a gear set for connecting the driving and driven members for rotation at different speeds, at least one gear being secured to the driving member to rotate therewith, means for connecting the driving member to the power source, a clutch engageable for connecting the driven member to the power source directly and independently of its connection through said gearing, speed responsive means rotatable by the driven member at driven member speed for engaging said clutch, and helical teeth on the driving member gear adapted under gear load to thrust said driving member gear axially to hold the engaging member of said clutch from moving to engaged position.

5. The combination, in a power transmitting mechanism, of an engine, a gear set having an input and an output member, a clutch responsive to engine speed for connecting the engine to the input member, a second clutch on the output member having an engaging member movable to connect the output member directly to the engine independently of whether the first clutch is engaged or not, centrifugal means on the second clutch, stressible resilient means operative to be stressed by said centrifugal means more or less as the output member speed rises and falls, means for applying the stress of the resilient means to the engaging member to urge movement into engagement, and helical teeth on said gearing operative by the torque load carried thereby to shift axially to apply pressure against and oppose movement of said engaging member to effect engagement of the second clutch.

6. Power transmitting mechanism comprising, in combination, an engine, a gear set, a pair of dry plate clutches, an oil tight housing surrounding the gear set, a separate housing surrounding the clutches, an input and an output member for the gear set both extending from the gear housing into the clutch housing, one of said clutches being carried by the engine and the second by the output member and operative respectively to connect the engine to the input member and the output member to the engine each independently of the other, torque sensitive means associated with said gearing and having a force proportionate to the load on said gearing and means for applying said force to said second clutch to cause said second clutch to remain disengaged.

7. In a power transmitting device, the combination of an engine, a gear set, a pair of dry plate clutches, an oil tight housing surrounding the gear set, a separate housing containing the clutches, an input and an output member for the gear set both extending from the gear housing into the clutch housing, one of said clutches being carried by the engine and the second by the output member and operative respectively to connect the engine to the input member and the output member to the engine each independently of the other, speed controlled means operative to urge engagement of the second said clutch, torque controlled means on the gearing in the gear housing, and means extending from the torque controlled means to the second clutch in the clutch housing and effective in proportion to the torque load carried by the gearing to oppose engagement of the second clutch.

8. The combination in a power transmitting device, of an engine, a gear set having an input member and an output member, means for connecting the engine to the input member, an oil tight housing surrounding said gear set, a clutch housing, said output member extending from the gear housing into the clutch housing, a dry plate clutch carried by the output member in the clutch housing, operative to connect the output member to the engine independently of the means for connecting the engine to the input member, a centrifugally operative device revolvable at output member speed for engaging said dry plate clutch, and helical teeth on one of the gears operative to thrust said gear axially in proportion to its load, and means moved by said thrust from said gear housing into said clutch housing operative to oppose engagement of said dry plate clutch.

9. A power transmitting device comprising, an engine, a clutch housing, a gear housing, a gear set in the gear housing having input and output members both extending from the gear housing into the clutch housing, an engine flywheel in the clutch housing, a dry plate clutch for connecting the flywheel to the input member, a second dry plate clutch for connecting the output member to the flywheel, independently of whether the first clutch is engaged or not, a resilient means stressible to urge movement of the engaging portion of the second said clutch to engaged position, centrifugal weights rotated at output member speed for stressing said resilient means more or less as the speed rises or falls, and torque controlled means comprising one of the gears having helical teeth and space for axial movement under load in the gear housing with means extending from the gear housing into the clutch housing whereby said axial movement may hold said engaging portion from moving to engaged position irrespective of the movement of the weights or the degree of stress of the springs.

10. In combination, an engine, an engine flywheel, a gear set, an oil tight housing surrounding the gear set, a separate clutch housing surrounding the flywheel, an input member and an output member both extending from the gear housing into the clutch housing, a normally disengaged dry plate clutch carried by the flywheel within the clutch housing adapted upon engagement to connect the flywheel to the input member, a second dry plate clutch carried by the output member within the clutch housing adapted upon engagement to connect the output member to the flywheel, centrifugal means for engaging the first clutch, a resilient means capable of being stressed and applied to a movable part of the second clutch to effect engagement, a centrifugal means driven at output member speed and adapted to vary the stress of the resilient means as the speed of the output member varies, and control means which includes one of the gears having helical teeth and space to move axially in the gear housing with means extending from said gear within said gear housing into said clutch housing and to said movable part, whereby the second clutch is urged to remain out of engagement in proportion to the torque load carried by said gear and urged into engagement in proportion to the stress of the resilient means.

11. The combination of an engine and a gear set comprising a sun gear, a second concentric gear, planet pinions in mesh with both gears, a planet pinion carrier, and braking means for holding the sun gear against backward rotation, with means for connecting the second gear to the engine, a clutch for connecting the carrier directly to the engine independently of the second gear connecting means, means to engage said clutch, and means operative by reaction of the gearing in proportion to the torque load carried extending from said gearing to said clutch to hold it in disengaged position.

12. In a transmission mechanism, the combination of an engine and a gear set comprising a sun gear, a ring gear, planet pinions in mesh with both gears, a planet pinion carrier and a means for holding the sun gear against backward rotation, with means for connecting the ring gear to the engine, and a clutch for connecting the carrier directly to the engine independently of its connection to the ring gear, means for engaging the clutch, and helical teeth on the ring gear operative to shift said gear axially under gear load into a position to hold the engaging member of said clutch in disengaged position.

13. The combination of an engine and a gear set comprising a sun gear, a second gear concentric therewith, planet pinions in mesh with both gears, a planet pinion carrier, and a one way brake for holding the sun gear against backward rotation only, with a main clutch means for connecting the engine to the second gear, an auxiliary clutch for connecting the carrier directly to the engine independently of the main clutch means, resilient means for urging engagement of the auxiliary clutch, and torque controlled means, operative by and in proportion to the reaction of the gearing under load and extending from said gearing to said resilient means to control engagement of the auxiliary clutch by said resilient means.

14. The combination of an engine and a gear set comprising a ring gear, a sun gear, planet pinions in mesh with both gears, a planet pinion carrier, and a one way brake for holding the sun gear against backward rotation only, with main clutch means for connecting the engine to the ring gear, an auxiliary clutch for connecting the carrier directly to the engine independently of the main clutch means, resilient means normally inoperative to engage the auxiliary clutch but adapted to be stressed and applied to the engaging member thereof to effect its engagement, a speed responsive means rotatable at carrier speed for stressing the resilient means more or less as the carrier speed rises and falls, and a torque operated member responsive to load carried by the gearing, extending from the gearing to the engaging member of the auxiliary clutch to oppose its engagement by the resilient means in proportion to the power being transmitted.

15. The combination of an engine and a helical toothed gear set comprising an axially shiftable ring gear, a sun gear, planet pinions in mesh with both gears, a planet pinion carrier, and a one way brake for holding the sun gear against backward rotation, with a main clutch for connecting the engine and ring gear, an auxiliary clutch, having an axially movable engaging member, for connecting the carrier directly to the engine independently of the main clutch, spring means normally inactive but adapted to be stressed and applied to the axially movable engaging member to effect engagement of the auxiliary clutch, a centrifugal weight rotatable at carrier speed for stressing the resilient means, said weight being hinged near one end, the other end being swingable outwardly, the body of the weight extending nearly parallel with the axis in the inner position and nearly right angles with the axis in the outer position, an axially movable spring stressing member having a working surface in a plane at right angles to the axis, means secured to the weight near the free end bearing against the said working surface whereby a given amount of centrifugal force will exert a greater axial force on the spring stressing member when the weight is near the inner position than when it is near the outer position, and means connecting the axially movable ring gear and the axially movable clutch engaging member whereby axial movement of the ring gear under load will oppose and prevent engagement of the auxiliary clutch until the axial force of the spring exceeds the axial force of the ring gear.

16. In a power transmitting mechanism, an input member, an output member, a clutch for connecting said members directly, a sun gear, means to hold said sun gear against backward rotation, a ring gear concentric with the sun gear adapted to be rotated by the input member, a planet pinion carrier on the output member, planet pinions on said carrier in mesh with both gears, normally inactive spring means adapted to be compressed and applied to the clutch to effect engagement, centrifugal weights rotatable by said output member and hinged to swing outwardly to different angular positions, leverage means between said weights and springs whereby the ratio of outward movement of the weights to the shortening of the springs is always $$\frac{\text{sine}}{\text{cosine}}$$

of the angle with a radius, helical teeth on the ring gear adapted to force it axially under load, and means extending from the ring gear to the spring means to oppose said spring means engaging said clutch.

17. The combination of an engine and a helical toothed gear set comprising a sun gear, a ring gear shiftable axially under load, planet pinions in mesh with both gears, a planet pinion carrier, means to hold the sun gear from rotating backwardly, a main dry plate clutch for connecting the engine to the ring gear, an auxiliary dry plate clutch for connecting the carrier to the engine independently of the main clutch, a housing surrounding the gear set, a separate housing surrounding the dry plate clutches, means to engage the main clutch, means to engage the auxiliary clutch comprising a movable clutch engaging member, a spring adapted to be stressed and applied to said member to move it axially to effect clutch engagement, a centrifugal weight, hinged to said clutch at a point on the weight away from its center of gravity, normally having an inner position such that a line drawn through two points representing its hinge center and its center of gravity will be nearly parallel to its axis of rotation, said weight being swingable on its hinge to an outer position where said line is nearly at right angles to said axis, an axially movable spring stressing member having a working surface at right angles to the axis, a roller on said weight at or near said center of gravity, adapted to roll on said surface as the weights move outwardly to move said stressing member axially to stress said spring, whereby the radially outward centrifugal force of said weight at any angular position to which it swings will have an axial spring compressing component of $$\frac{\text{cosine}}{\text{sine}}$$

of the angle with the axis, and means extending from the axially shiftable ring gear to the movable clutch engaging member and operative by torque load on said ring gear to oppose movement of said engaging member thereby to restrain said spring from effecting auxiliary clutch engagement.

18. Power transmission mechanism comprising, an input member, an output member, a clutch for connecting said members directly, a sun gear, means to hold the sun gear against backward rotation, a ring gear concentric with the sun gear adapted to be rotated by the input member, a planet pinion carrier on the output member, planet pinions on said carrier in mesh with both gears, resilient means normally incapable of engaging said clutch but adapted to be stressed and applied to said clutch to engage it, speed responsive means for stressing said resilient means more or less as the speed rises and falls, and torque responsive means comprising helical teeth on the ring gear and pinions adapted to move said ring gear axially under load to obstruct operation of said resilient means to effect clutch engagement.

19. The combination of an engine and gear mechanism having input and output members, clutching means connecting the engine to the input member, a clutch for connecting the output member to the engine directly and operative independently of the input member clutching means, said clutch having a movable clutch engaging member, a resilient means adapted to be stressed and applied to said movable member to effect clutch engagement, a centrifugal weight hinged away from its center of gravity to said clutch and adapted to swing outward until a line drawn through two points representing its hinge and its center of gravity is nearly radial and to swing inward until a line drawn through the same two points is transverse to the said radial line, a stressing member movable in the general direction of the said transverse line to stress the resilient means, means secured to said weight substantially on said line operable against a substantially radial surface of the stressing member, whereby the radial centrifugal force of said weight at any angular position in its travel will have a transverse stressing component of $$\frac{\text{sine}}{\text{cosine}}$$

of the angle with a radius, and means responsive to torque load on said gear mechanism extending from said gear mechanism to said movable clutch engaging member to restrain its movement by said stressed resilient member.

20. Power transmission mechanism comprising a driving member, a driven member, a clutch for connecting said members directly, a sun gear, means to hold the sun gear against backward rotation, a second gear concentric with the sun gear adapted to be rotated by the driving member, a planet pinion carrier on the driven member, planet pinions on said carrier in mesh with both gears, speed responsive means for engaging the clutch, and torque responsive means comprising helical teeth on the concentric gear and pinions adapted, under load to move axially and oppose engagement of said clutch by said speed responsive means.

21. In combination with a power unit, a planetary gear-set comprising, a sun gear, a driving gear, a planet pinion in mesh with both gears, a driven planet pinion carrier, means for retarding sun gear rotation, a clutch for connecting the driving gear to the power unit, a second clutch for connecting the carrier directly to the power unit independently of the first clutch, automatic means for moving the second clutch to engaged position, torque sensitive means on said gearing, and means operative by load on said torque sensitive means to move said second clutch to a disengaged position.

22. The combination with a motor, of planetary gear mechanism comprising, a sun gear, a driving gear, planet pinions in mesh with both gears, a driven planet pinion carrier, means for arresting rotation of said sun gear, a clutch for connecting the driving gear to the motor, means drivably connecting said driving gear and clutch whereby said driving gear may move axially while being rotatably driven, torque sensitive means including means on the driving gear for moving it axially, a second clutch engageable for connecting said carrier directly to the motor independently of the first clutch and adapted to be held in fully disengaged position by axial movement of said driving gear under torque load thereon.

23. The combination with a power source of a planetary gear mechanism comprising a sun gear, a concentric driving gear, planet pinions in mesh with both gears, a driven planet pinion carrier, means to hold the sun gear against backward rotation, a clutch for connecting the driving gear to the power source, means interposed between said driving gear and clutch whereby said driving gear may move axially while being rotatably driven thru said clutch, a second clutch for connecting the carrier to the power source directly and independently of the first clutch, means to engage the second clutch, and helical teeth on the driving gear operative to move said driving gear axially under load, and means interposed between said driving gear and said second clutch whereby said axial movement holds said second clutch fully disengaged.

24. In combination, an engine, a sun gear, means to hold said sun gear against backward rotation, a driving ring gear, a clutch for connecting said ring gear to the engine, planet pinions in mesh with both gears, a driven planet pinion carrier, a second clutch for connecting said carrier to the engine independently of whether the first clutch is engaged or disengaged, helical teeth on said gears whereby they tend to move axially under load, said ring gear having space to move axially, antifriction means connecting said first clutch and ring gear whereby said ring gear may move freely in an axial direction while being rotatably driven, means to engage said second clutch and means connecting said ring gear and second clutch whereby said ring gear movement fully disengages said second clutch.

25. In combination, an engine, a driving gear rotated by said engine, a sun gear concentric therewith, means to control sun gear rotation, a planet pinion in mesh with both gears, a driven planet pinion carrier, and a clutch for connecting said carrier to said engine directly and independently of said gearing, said clutch comprising an axially movable clutch engaging member, a spring adapted to be stressed and applied to said member to move it axially to effect clutch engagement, a centrifugal weight hinged to said clutch at a point on the weight away from its center of gravity, normally having an inner position such that a line drawn thru two points representing its hinge center and its center of gravity will be nearly parallel to the axis of rotation, said weight being swingable on its hinge to an outer position where said line is nearly at right angles to the axis, an axially movable spring stressing member having a working surface at right angles to the axis, and a roller on said weight at a point away from said hinge and substantially on said line adapted to roll on said surface as the weight moves outwardly to move said stressing member axially to stress said spring, whereby the radially outward centrifugal force of said weight at any angular position to which it swings will have an axial spring compressing component of $$\frac{\text{cosine}}{\text{sine}}$$

of the angle of the line with the axis.

26. Power transmission mechanism comprising, a driving member, a driven member, gearing for connecting said members to revolve at different speeds, and a clutch for connecting said members directly and independently of said gearing, said clutch comprising, an axially movable clutch engaging member, a resilient means adapted to be stressed and applied to said member to move it axially to effect clutch engagement, a centrifugal weight hinged to said clutch at a point on the weight away from its center of gravity normally having an inner position such that a line drawn thru two points representing its hinge center and its center of gravity will be nearly parallel to the axis of rotation, said weight being swingable on its hinge to an outer position where said line is nearly at right angles to the said axis, an axially movable stressing member having a working surface at right angles to said axis, and means on said weight substantially on said line for engaging said working surface and moving said stressing member to increase the stress of said resilient means as the weight swings outwardly, whereby the radially outward centrifugal force of said weight at any position in its travel will have an axial stressing component of $$\frac{\text{cosine}}{\text{sine}}$$

of the angle with the axis.

27. Power transmission mechanism comprising, a driving member, a driven member, gearing for connecting said members, and a clutch for connecting said members directly and independently of said gearing, said clutch having a movable clutch engaging member, a resilient means adapted to be stressed and applied to said movable member to effect clutch engagement, a centrifugal weight hinged away from its center of gravity to said clutch and adapted to swing outward until a line drawn thru two points representing its hinge and its center of gravity is nearly radial and to swing inward until a line drawn thru the same two points is transverse to the said radial line, a stressing member movable in the general direction of the said transverse line to stress said resilient means, and means carried by said weight substantially on said line operable against a substantially radial surface of said stressing member, whereby the radial centrifugal force of said weight at any angular position in its travel will have a transverse stressing component of $$\frac{\text{sine}}{\text{cosine}}$$

of the angle with a radius.

28. The combination of an engine, a driving clutch part rotated by said engine, a driven clutch member arranged to engage said part, a centrifugally moved weight carried by the driven clutch member for effecting said engagement, a separate power transmitting means for rotating the driven clutch member by the engine before said engagement has been effected, and torque responsive connecting parts between a member of said separate power transmitting means and said weight for controlling movement of the weight to effect said engagement.

FREDERICK W. COTTERMAN.